United States Patent [19]

Tanahashi

[11] Patent Number: 4,839,604

[45] Date of Patent: Jun. 13, 1989

[54] INTEGRATED CIRCUIT WITH CLOCK DISTRIBUTION MEANS FOR SUPPLYING CLOCK SIGNALS

[75] Inventor: Toshio Tanahashi, Tokyo, Japan

[73] Assignee: NEC Corporation, Tokyo, Japan

[21] Appl. No.: 169,043

[22] Filed: Mar. 16, 1988

[30] Foreign Application Priority Data

Mar. 17, 1987 [JP] Japan .................................. 63-63127

[51] Int. Cl.[4] .......................... H03K 5/15; H03K 5/22; H03K 5/05; H03K 17/00

[52] U.S. Cl. ........................................ 328/62; 307/480; 307/262; 307/269; 328/72; 328/105; 328/109

[58] Field of Search ................ 307/443, 480, 262, 269, 307/268, 272.1, 272.2, 582, 479; 328/60, 62, 72, 105, 109; 377/106

[56] References Cited

U.S. PATENT DOCUMENTS

| | | | |
|---|---|---|---|
| 3,670,249 | 6/1972 | Meslener | 328/163 |
| 3,921,079 | 11/1975 | Heffner et al. | 328/105 X |
| 3,942,124 | 3/1976 | Tarczy-Hornoch | 307/269 |
| 3,947,697 | 3/1976 | Archer et al. | 307/490 |
| 4,286,173 | 8/1981 | Oka et al. | 307/440 |
| 4,337,433 | 6/1982 | Yoshimura | 328/105 X |
| 4,380,083 | 4/1983 | Andersson et al. | 328/63 |
| 4,398,208 | 8/1983 | Murano et al. | 357/81 |
| 4,423,383 | 12/1983 | Svendsen | 328/60 X |
| 4,562,247 | 12/1985 | Ecton | 307/465 |
| 4,636,656 | 1/1987 | Snowden et al. | 307/470 |
| 4,638,256 | 1/1987 | Hong et al. | 328/62 X |
| 4,686,480 | 8/1987 | Katto et al. | 307/262 X |
| 4,700,350 | 10/1987 | Douglas et al. | 307/269 X |
| 4,719,365 | 1/1988 | Misono | 307/480 X |
| 4,772,888 | 9/1988 | Kimura | 307/480 |

Primary Examiner—Stanley D. Miller
Assistant Examiner—David R. Bertelson
Attorney, Agent, or Firm—Burns, Doane, Swecker & Mathis

[57] ABSTRACT

An integrated circuit which includes a plurality of input storage circuits, each of which has a first input terminal, a first output terminal and a first clock terminal, and, in synchronism with a clock signal fed to the first clock terminal, stores input signals sequentially appearing at the first input terminal to sequentially produce the input signals to the first output terminal. The integrated circuit further includes a logic circuit section composed of at least one of a combinational logic circuit and a sequential logic circuit, the logic circuit section being connected to the first output terminals of the first input storage circuits for receiving the input signals. The integrated circuit further includes a plurality of output storage circuits each of which has a second input terminal, a second output terminal and a second clock terminal, and, in synchronism with a clock signal fed to the second clock terminal, stores output signals sequentially supplied from the logic circuit section to the second input terminal to sequentially produce the output signals to the second output terminal, and includes clock distribution means for generating the clock signal fed to the second clock terminal and the clock signal fed to the first clock terminal which is delayed in phase relative to the clock signal fed to the second clock terminal.

7 Claims, 10 Drawing Sheets

INTEGRATED CIRCUIT WITH CLOCK DISTRIBUTION MEANS FOR SUPPLYING CLOCK SIGNALS

BACKGROUND OF THE INVENTION

The invention relates to an integrated circuit (IC) with clock distribution means for supplying clock signals A prior art IC includes a plurality of input terminals, input flip-flops (FFs) connected to the input terminals, a plurality of output terminals, output FFs connected to the output terminals, a logic circuit network provided between the input and output FFs and made up of a combinational logic circuit and a plurality of FFs, and a clock distribution circuit for distributing to all the FFs clock signals which are identical in clock period and phase with each other. Such prior art ICs are mounted on a substrate and electrically interconnected by signal lines provided in the substrate, as disclosed in U.S. Pat. No. 4,398,208. Since clock signals of the same phase are applied to the output FFs of one IC and the input FFs of the other IC, the maximum-allowable-signal-propagation delay time of signal lines which interconnect those ICs has to be less than the clock period T of the clock signals. This gives rise to a disadvantage when the clock period is reduced with the intention of increasing the operation rate of the ICs. Specifically, although a decrease in the clock period is not critical within the individual ICs because the signal lines formed therein are extremely short, it prevents output signals of the output FFs of one IC from being correctly taken in by the input FFs of the other IC because the clock period becomes less than the maximum allowable signal propagation delay time.

SUMMARY OF THE INVENTION

An object of the invention is, therefore, to provide an IC free from the above-mentioned disadvantage.

According to an aspect of the invention, there is provided an IC which comprises: a plurality of input storage circuits, each of which has a first input terminal, a first output terminal and a first clock terminal, and, in synchronism with a clock signal fed to the first clock terminal, stores input signals sequentially appearing at the first input terminal to sequentially produce the input signals to the first output terminal; a logic circuit section composed of a combinational logic circuit or a sequential logic circuit and connected to the first output terminals of the input storage circuits for receiving the input signals; a plurality of output storage circuits, each of which has a second input terminal, a second output terminal and a clock terminal, and, in synchronism with a second clock signal fed to the second clock terminal, stores output signals sequentially supplied from the logic circuit section to the second input terminal to sequentially produce the output signals to the second output terminal; and clock distribution means for generating the clock signal fed to the second clock terminal and the clock signal fed to the first clock terminal which is delayed in phase relative to the clock signal fed to the second clock terminal.

BRIEF DESCRIPTION OF THE DRAWINGS

Other features and advantages of the invention will become more apparent from the following detailed description when taken in conjunction with the accompanying drawings in which.

In the drawings, the same reference numerals represent the same structural elements.

DETAILED DESCRIPTION OF PREFERRED EMBODIMENTS

Figure 1:
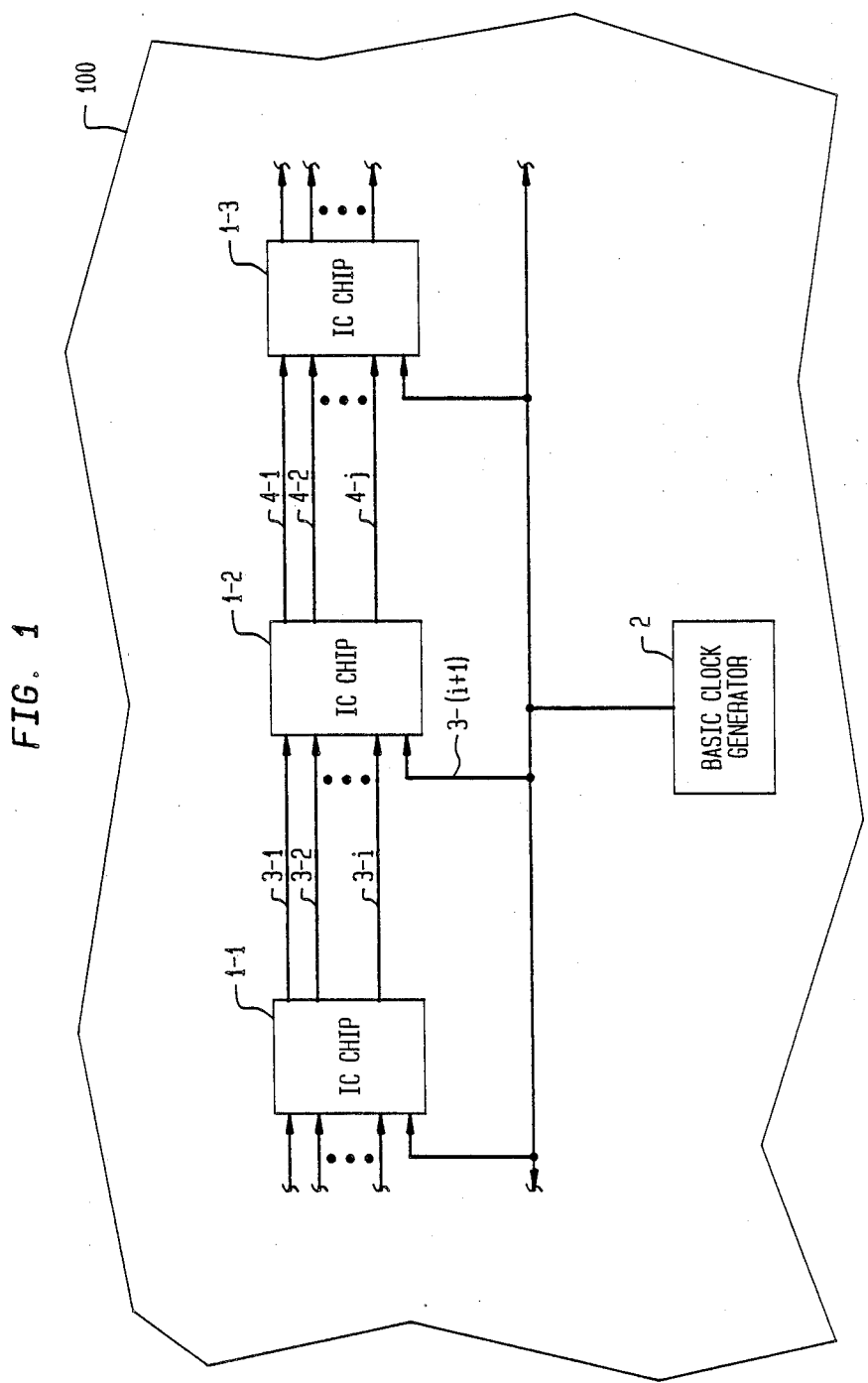
FIG. 1 is a block diagram of a package provided with ICs in accordance with the invention.

Electronic equipment such as a data processor includes a plurality of IC packages each having a plurality of IC chips mounted on a plurality of substrates. As shown in FIG. 1, such an IC package comprises a substrate 100, a plurality of IC chips (only three chips 1-1, 1-2 and 1-3 being shown) mounted on the substrate 100, a basic clock generator 2 mounted on the substrate 100 for generating a basic clock signal having a clock period of T (which is equal to 1/fc where the fc represents the clock frequency of the basic clock signal), and a plurality of wirings provided in the substrate 100 for interconnecting the IC chips as well as the IC chips and the generator 2. The basic clock signal from the generator 2 is fed to clock input terminals of the IC chips.

The present invention is applied to all of these IC chips. The following description will concentrate on the IC chip 1-2 by way of example.

Figure 2:
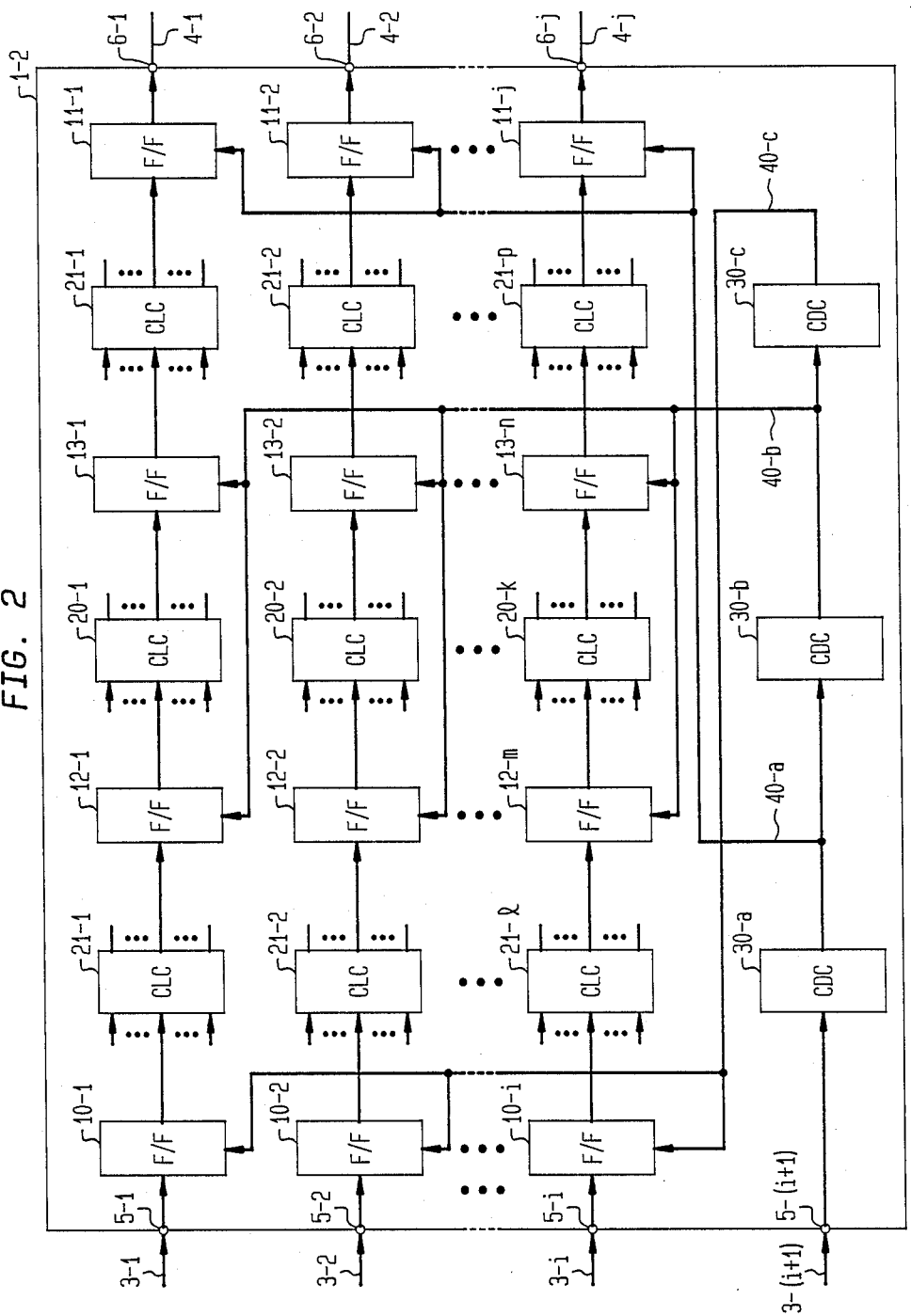
FIG. 2 is a block diagram of a first embodiment of the invention.

Referring to FIG. 2, a first embodiment of the invention comprises i input FFs 10-1 to 10-$i$ supplied with signals on i signal lines 3-1 to 3-$i$ via signal input terminals 5-1 to 5-, $j$ output FFs 11-$l$ to 11-$j$ supplying their outputs to signal lines 4-1 to 4-$j$ via output terminals 6-1 to 6-$j$, $m$ first intermediate FFs 12-1 to 12-$m$, $n$ second intermediate FFs 13-1 to 13-$n$, $l$ combinational logic circuits (CLCs) 21-1 to 21-$l$ provided between a group of the FFs 10-1 to 10-$i$ and a group of the FFs 12-1 to 12-$m$, $k$ CLCs 20-1 to 20-$k$ provided between a group of the FFs 12-1 to 12-$m$ and a group of the FFs 13-1 to 13-$n$, $p$ CLCs 21-1 to 21-$p$ provided between a group of the FFs 13-1 to 13-$n$ and a group of the FFs 11-1 to 11-$j$, a clock distribution circuit (CDC) 30-$a$ supplied with the basic clock signal from the basic clock generator 2 via a signal line 3-(i+1) and a clock input terminal 5-(i+1), a CDC 30-$b$ given a first clock signal produced by the CDC 30-$a$, a CDC 30-$c$ supplied with a second clock signal from the CDC 30-$b$ to produce a third clock signal, a group of signal lines 40-$a$ adapted to propagate the first clock signal to the FFs 11-1 to 11-$j$, a group of signal lines 40-b adapted to propagate the second clock signal to the FFs 12-1 to 12-m and the FFs 13-1 to 13-n, and a group of signal lines 40-c adapted to propagate the third clock signal to the FFs 10-1 to 10-i.

Each of the FFs 10-1 to 10-, i, 11-1 to 11-j, 12-1 to 12-m and 13-1 to 13-n takes in and stores signals fed sequentially to its signal input terminal at positive-going edges of the clock signal fed to its clock input terminal.

Figure 5:
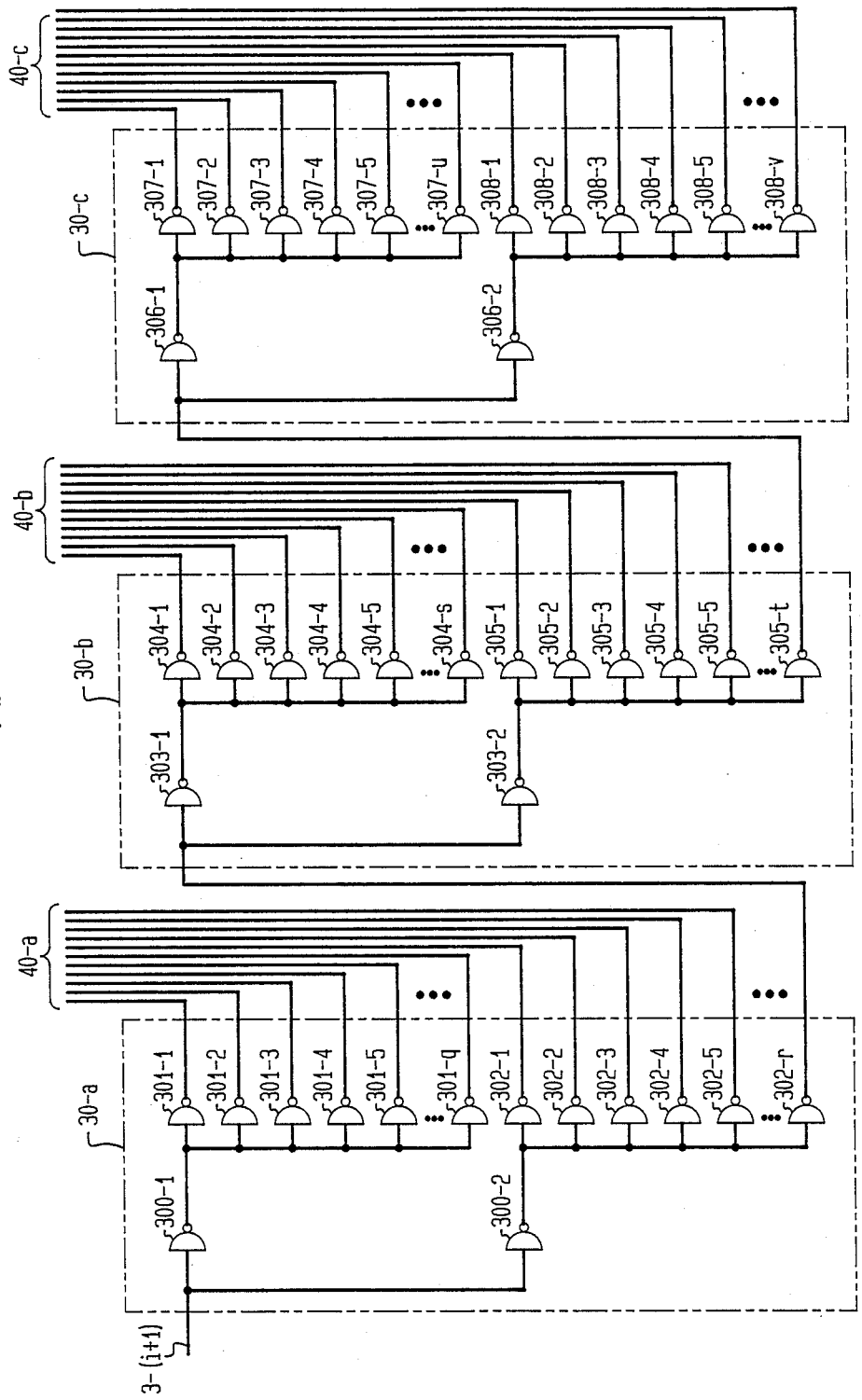
FIG. 5 is a block diagram of an example of a clock distribution circuit.

Referring to FIG. 5, the CDC 30-a is composed of NAND gates 300-1 and 300-2 supplied with the basic clock signal over the signal line 3-(i+1), NAND gates 301-1 to 301-q supplied with the output signal of the gate 300-1, and NAND gates 302-1 to 302-r supplied with the output signal of the gate 300-2. In response to the first clock signal, the gates 301-1 to 301-q and 302-1 to 302-(r-1) produce signals serving as the first clock signal to the signal lines of the group 40-a. The first clock signal lags behind the basic clock signal by a period of time equal to the signal propagation delay time 2td of two gates. The CDC 30-b comprises NAND gates 303-1 and 303-2 given the output signal of the gate 302-r of the CDC 30-a, NAND gates 304-1 to 304-s given the output signal of the gate 303-1, and NAND gates 305-1 to 305-t supplied with the output signal of the gate 303-2. The gates 304-1 to 304-s and 305-1 to 305-(t-1) produce signals serving as the second clock signal to the signal lines of the group 40-b. The second clock signal lags by the period of time 2td behind the first clock signal. Further, the CDC 30-c is composed of NAND gates 306-1 and 306-2 supplied with the output signal of the gate 305-t of the CDC 30-b, NAND gates 307-1 to 307-u given the output signal of the gate 306-1, and NAND gates 308-1 to 308-v fed with the output signal of the gate 306-2. The gates 307-1 to 307-u and 308-1 to 308-v produce signals serving as the third clock signal to the signal lines of the group 40-c. The third clock signal lags by the period of time 2td behind the second clock signal. FIGS. 6(a) to 6(d) show relationships in phase between the basic clock signal, the first clock signal, the second clock signal and the third clock signal.

Figure 6:
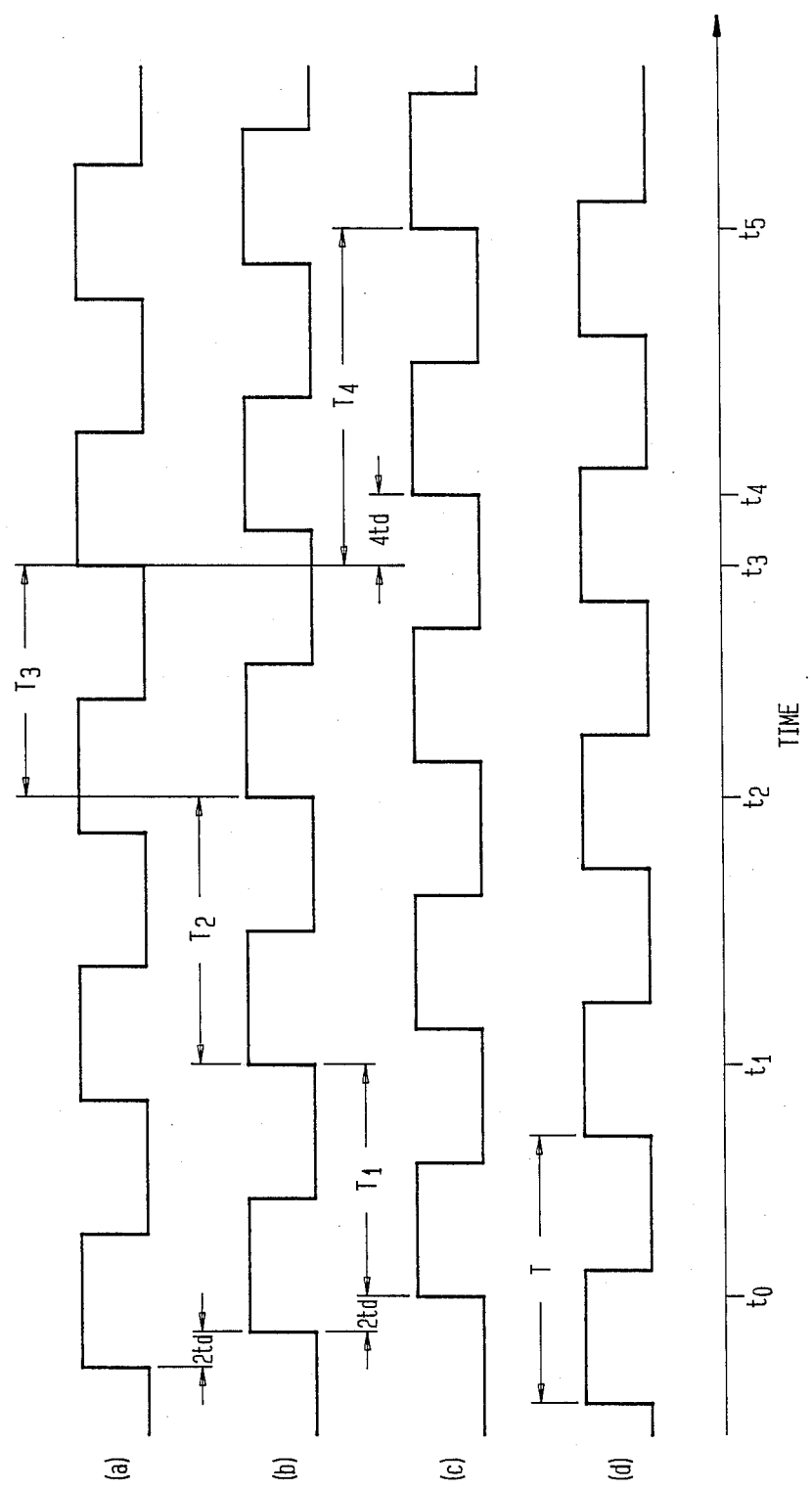
FIGS. 6(a), 6(b), 6(c) and 6(d) are wave-form diagrams representative of relationships in phase between clock signals used in the first embodiment.

The operation of the embodiment will be described with reference to FIGS. 2 and 6. The FFs 10-1 to 10- store respective signals appearing on the signal lines 3-1 to 3-i at a positive-going edge at a time $t_0$ of the third clock signal and feeds the signals stored to the CLCs 21-1 to 21-l, respectively. Signals produced by the CLCs 21-1 to 21-l in response to the output signals of the FFs 10-1 to 10-i are applied to and stored into the FFs 12-1 to 12-m at a positive-going edge at a time $t_1$ of the second clock signal. In this case, the output signals of the CLCs 21-1 to 21-l have to be established within a period of time $T_1(=t_1-t_0)$ which is shorter than the period T by 2td. In response to the signals stored into the FFs 12-1 to 12-m and produced therefrom at the time $t_l$, the CLCs 20-1 to 20-k produce signals which are fed to the FFs 13-1 to 13-n and stored thereinto at a positive-going edge at a time $t_2$ of the second clock signal. In this instance, the output signals of the CLCs 20-1 to 20-k should only be established within a period of time $T_2(=t_2-t_1)$ which is equal to the period T. Further, in response to the signals stored into the FFs 13-1 to 13-n and produced therefrom at the time $t_2$, the CLCs 21-1 to 21-p produce signals which are fed to the FFs 11-1 to 11-j and stored thereinto at a positive-going edge at a time $t_3$ of the first clock signal. The output signals of the CLCs 21-1 to 21-p have to be established within a period of time $T_3(=t_3-t_2)$ which is shorter than the period T by 2td. The signals stored into the FFs 11-1 to 11-j at the time $t_3$ as mentioned above are propagated through the signal lines 4-1 to 4-j to reach input FFs built in the IC chip 1-3. Since the propagation delay time of the signals propagated through the individual signal lines 4-1 to 4-j is sufficiently greater than a period of time of 4td, the output signals at the time $t_3$ of the FFs 11-1 to 11-j of the IC chip 1-2 are stored into the input FFs of the IC chip 1-3 not at the first positive-going edge at a time $t_4$ of the third clock signal which appears later than the time $t_3$ but at the subsequent positive-going edge at a time $t_5$ of the same. All that is required, therefore, is that the signal propagation delay time as measured between IC chips be shorter than a period of time $T_4(=t_5-t_3)$ which is longer than the period T by 4td.

As mentioned above, the allowable maximum signal propagation delay time achievable with the embodiment is $T_4$ which is longer than that of the prior art which is equal to the period T, by a period of time of 4td.

Figure 3:
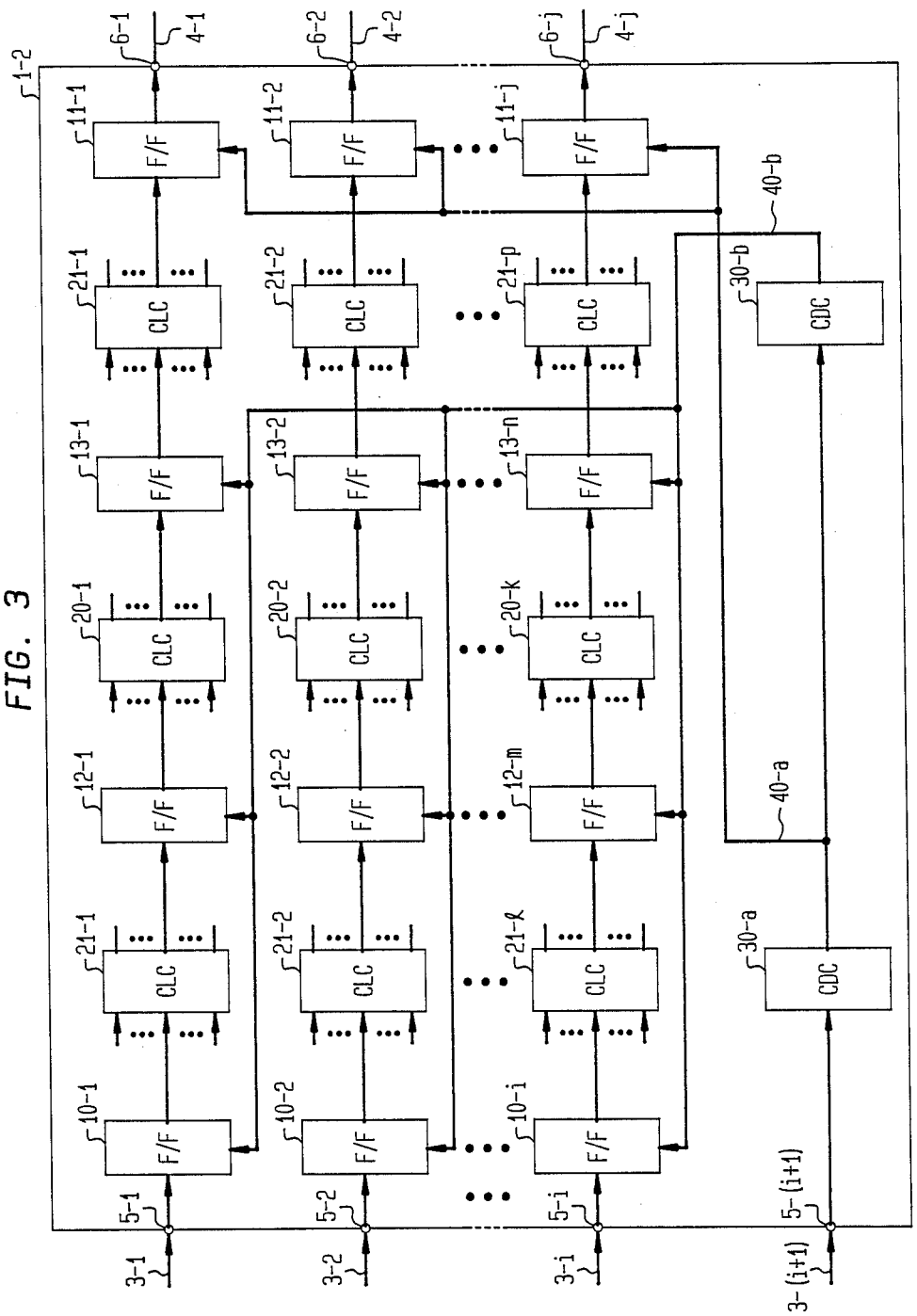
FIG. 3 is a block diagram of a second embodiment of the invention.
Figure 7:
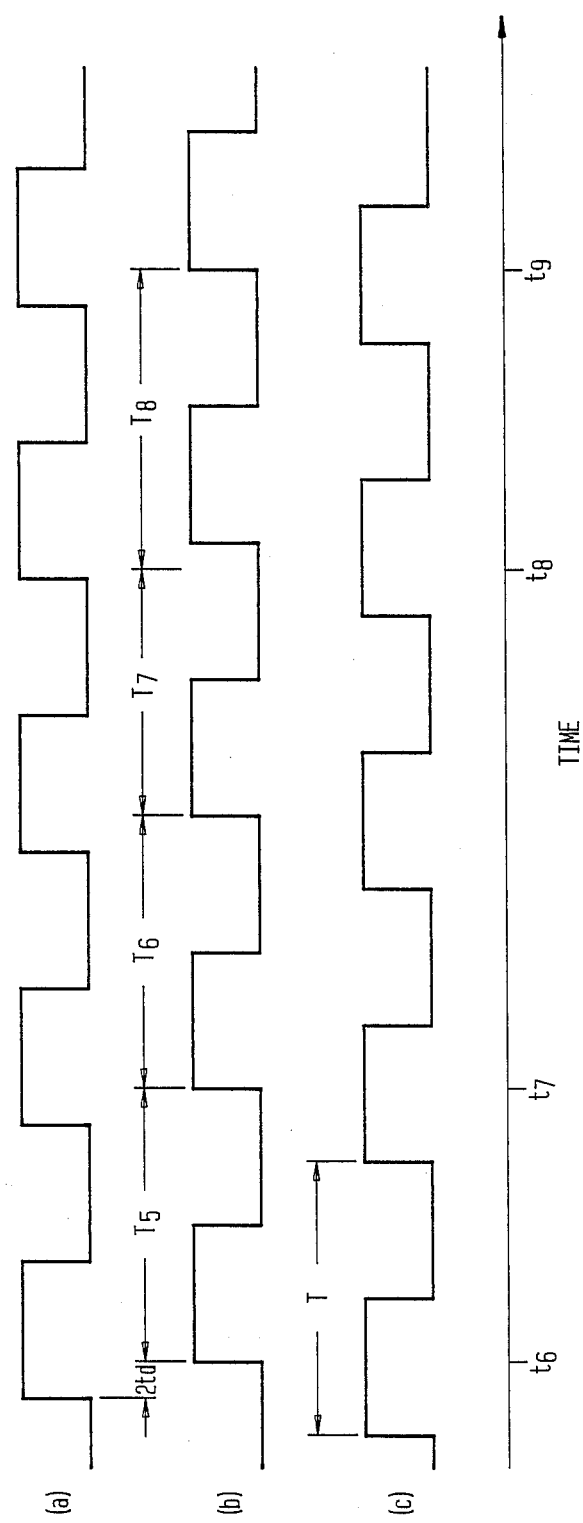
FIGS. 7(a), 7(b) and 7(c) are wave-form diagrams representative of relationships in phase between clock signals used in the second embodiment.

Referring to FIG. 3, a second embodiment of the invention differs from the first embodiment in that the former lacks the CDC 30-c used in the latter and the second clock signal produced by the CDC 30-b is supplied to the input FFs 10-1 to 10-i. The first clock signal from the CDC 30-a, the second clock signal from the CDC 30-b, and the basic clock signal from the signal line 3-(i+1) are shown in FIGS. 7(a), 7(b) and 7(c), respectively. The FFs 10-1 to 10-store signals appearing on the signal lines 3-1 to 3-i at a positive-going edge at a time $t_6$ of the second clock signal and deliver the signals stored to the CLC 21-1 to 21-l, respectively. In response, the CLCs 21-1 to 21-l produce signals applied to the FFs 12-1 to 12-m and stored thereinto at a positive-going edge at a time $t_7$ of the second clock signal. In this case, the output signals of the CLCs 21-1 to 21-l should only be established within a period of time $T_5(=t_7-t_6)$ which is equal to the period T. As in the first embodiment, the output signals of the CLCs 20-1 to 20-k and those of the CLCs 21-1 ro 21-p have to be established within $T_6$ and $T_7$, respectively, which are equal to the period T and a period of time (T - 2td), respectively. In this embodiment, the maximum allowable signal propagation delay time is equal to a period of $T_8$ between a positive-going edge at a time $t_8$ of the first clock signal and the second positive-going edge at a time $t_9$ of the second clock signal which appears after the time $t_8$. The period $T_8$ is longer than the period T by 2td.

Figure 4:
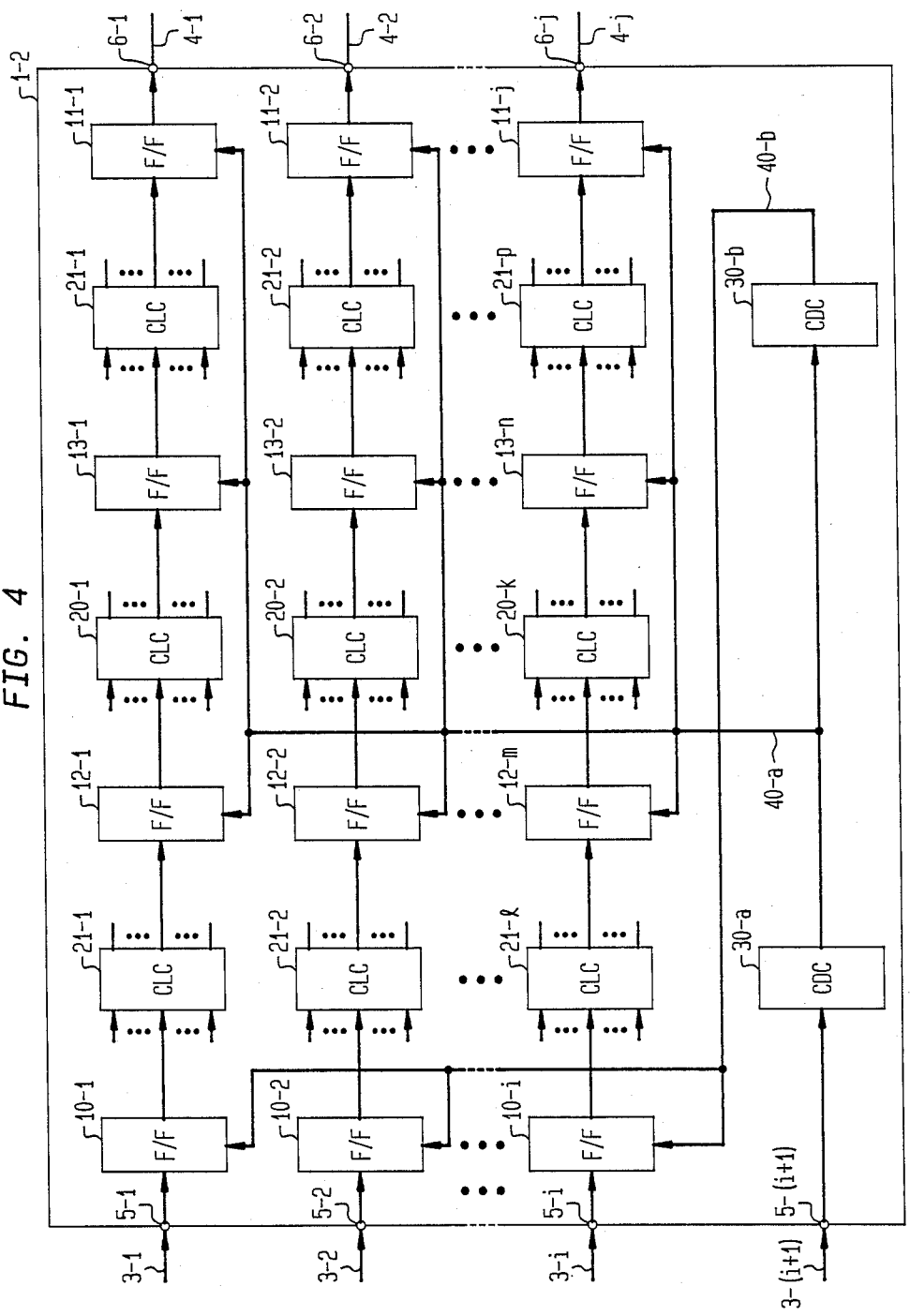
FIG. 4 is a block diagram of a third embodiment of the invention.
Figure 8:
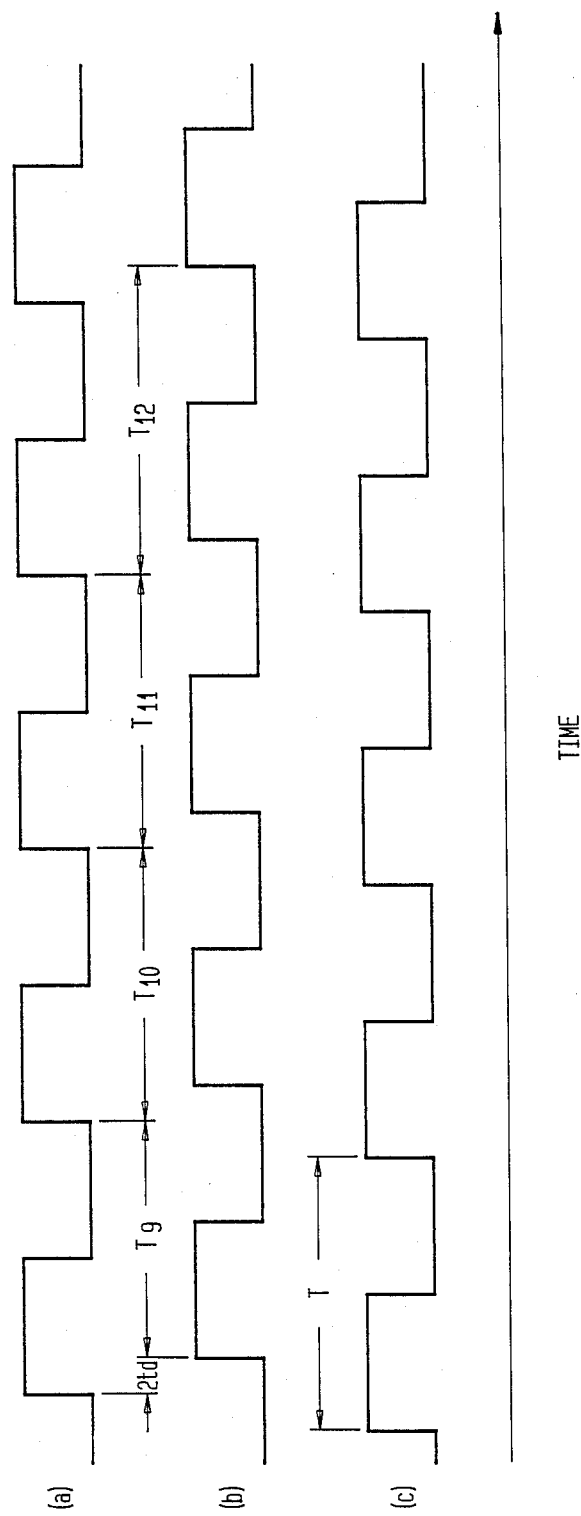
FIGS. 8(a), 8(b) and 8(c) wave-form diagrams representative of relationships in phase between clock signals used in the third embodiment.
Figure 9:
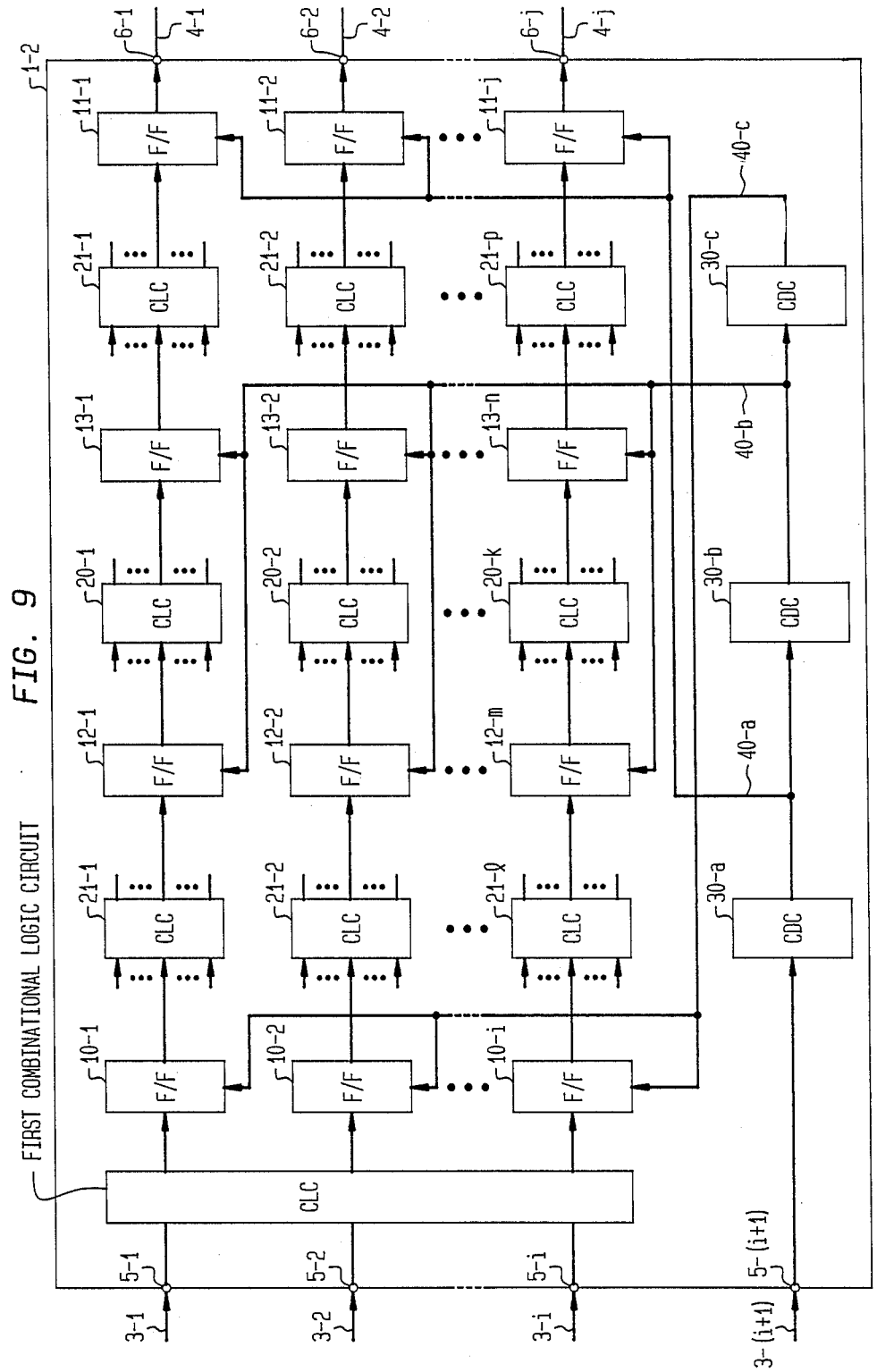
FIG. 9 illustrates a first combinational circuit in an embodiment of the invention.
Figure 10:
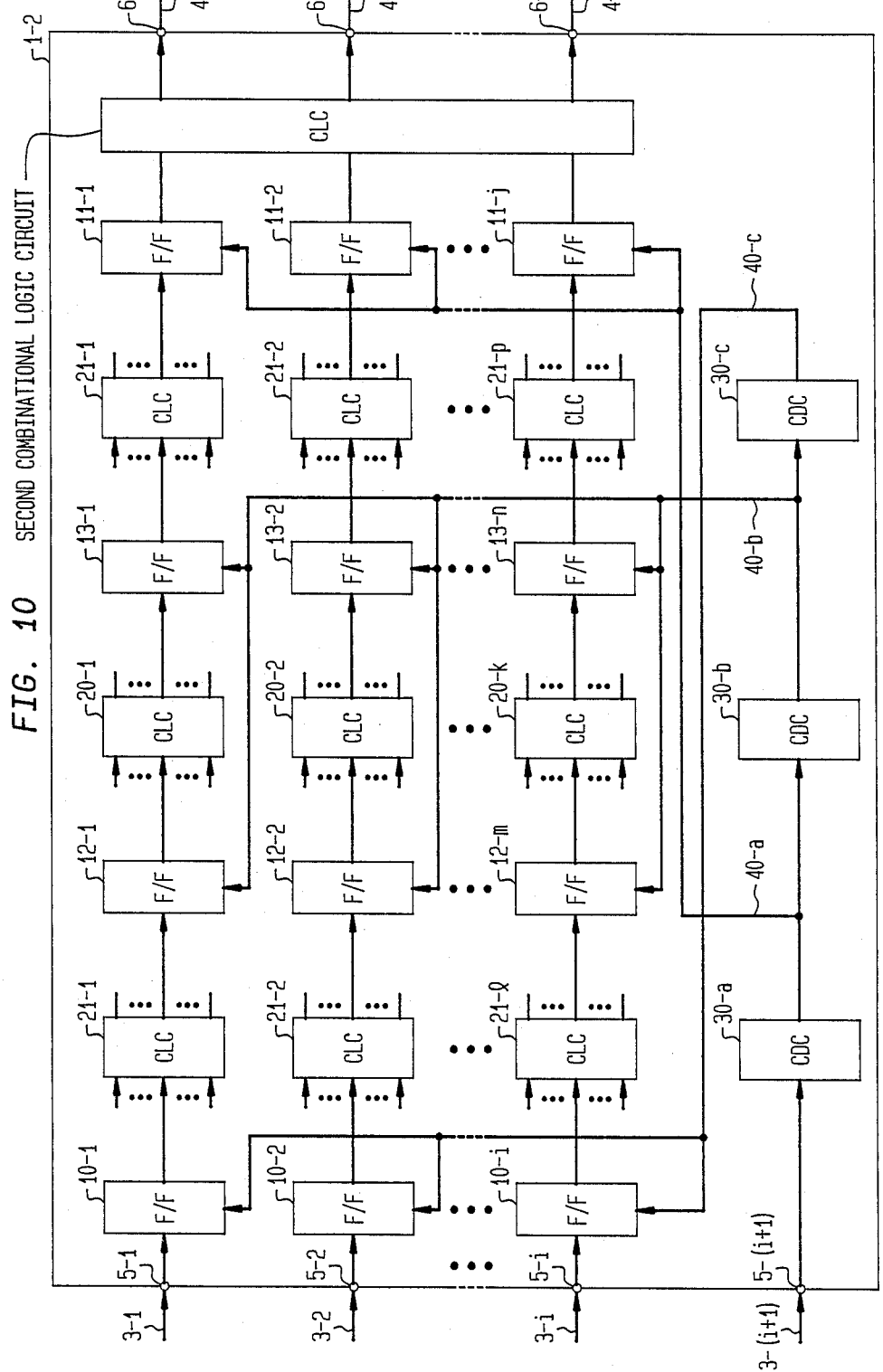
FIG. 10 illustrates a second combinational logic circuit in an embodiment of the invention.

Referring to FIG. 4, a third embodiment of the invention differs from the first embodiment in that the former lacks the CDC 30-c employed in the latter, supplies the second clock signal from the CDC 30-b to the input FFs 10-1 to 10-i and feeds the first clock signal from the CDC 30-a to the FFs 12-1 to 12-m and 13-1 to 13-n. The first clock signal from the CDC 30-a, the second clock signal from the CDC 30-b, and the basic clock signal from the signal line 3-(i+1) are shown in FIGS. 8(a), 8(b) and 8(c), respectively. In this embodiment, the output signals of the CLCs 21-1 to 21-l, those of the CLCs 20-1 to 20-k, and those of the CLCs 21-1 to 21-p have to be established within periods of time of $T(=T-2td)$, $T_{10}(=T)$ and $T_{11}(=T)$, respectively. The maximum allowable signal propagation delay time available with the embodiment is $T_{12}(=T+2td)$.

Throughout the first to third embodiments shown and described above, the signal input terminals 5-1 to 5-i and the FFs 10-1 to 10-*i* are directly connected, and so are the signal output terminals 6-1 to 6-*j* and the FFs 11-1 to 11-*j*. Alternatively, a CLC may be connected between each of the signal input and output terminals 5-1 to 5-*i* and 6-1 to 6-*j* and its associated FF.

While this invention has been described in conjunction with the preferred embodiments thereof the invention is not limited thereto, as it will now readily be possible for those skilled in the art to put this invention into practice in various other manners within the scope of the claims.

What is claimed is:

1. An integrated circuit comprising:
    a plurality of input storage circuits, each of which has a first input terminal, a first output terminal and a first clock terminal, and, in synchronism with a clock signal fed to said first clock terminal, stores input signals sequentially appearing at said first input terminal to sequentially produce said input signals to said first output terminal;
    a logic circuit section composed of at least one of a combinational logic circuit and a sequential logic circuit, said logic circuit section being connected to the first output terminals of said input storage circuits for receiving said input signals;
    a plurality of output storage circuits, each of which has a second input terminals, a second output terminal and a second clock terminal, and, in synchronism with a clock signal fed to said second clock terminal, stores output signals sequentially supplied from said logic circuit section to said second input terminal to sequentially produce said output signals to said second output terminal; and
    clock distribution means for generating said clock signal fed to said second clock terminal and said clock signal fed to said first clock terminal which is delayed in phase relative to said clock signal fed to said second clock terminal.

2. An integrated circuit as claimed in claim 1, further comprising:
    a plurality of third input terminals for supplying said first input terminals with said input signals which come in from outside said integrated circuit; and
    a plurality of third output terminals for delivering said output signals from said output storage circuits to outside said integrated circuit.

3. An integrated circuit as claimed in claim 1, further comprising:
    a first combinational logic circuit connected to said first input terminals; and
    a plurality of third input terminals for supplying said first combinational logic circuit with said input signals which come in from outside said integrated circuit.

4. An integrated circuit as claimed in claim 1, further comprising:
    a combinational logic circuit connected to said second output terminals; and
    a plurality of third output terminals for delivering said output signals to outside said integrated circuit.

5. An integrated circuit as claimed in claim 1, wherein said logic circuit section includes said sequential logic circuit and one of said clock signal fed to said first clock terminal and said clock signal fed to said second clock terminal is fed to storage circuits included in said sequential logic circuit.

6. An integrated circuit as claimed in claim 1, wherein said logic circuit section includes said sequential logic circuit and said clock distribution means is constructed to feed to storage circuits included in said sequential logic circuit a clock signal which is delayed in phase relative to said clock signal fed to said second clock terminal and advanced in phase relative to said clock signal fed to said first clock terminal.

7. An integrated circuit as claimed in claim 3, further comprising:
    a second combinational logic circuit connected to said second output terminals; and
    a plurality of third output terminals for delivering said output signals to outside said integrated circuit.

* * * * *

REEXAMINATION CERTIFICATE (1863rd)
United States Patent [19]
Tanahashi

[11] B1 4,839,604
[45] Certificate Issued Dec. 1, 1992

[54] INTEGRATED CIRCUIT WITH CLOCK DISTRIBUTION MEANS FOR SUPPLYING CLOCK SIGNALS

[75] Inventor: Toshio Tanahashi, Tokyo, Japan

[73] Assignee: NEC Corporation, Tokyo, Japan

Reexamination Request:
No. 90/002,563, Feb. 12, 1992

Reexamination Certificate for:
Patent No.: 4,839,604
Issued: Jun. 13, 1989
Appl. No.: 169,043
Filed: Mar. 16, 1988

[30] Foreign Application Priority Data

Mar. 17, 1987 [JP] Japan .................. 63-63127

[51] Int. Cl.⁵ .................. H03K 5/15; H03K 5/22; H03K 5/05; H03K 17/00
[52] U.S. Cl. .................. 328/62; 307/480; 307/262; 307/269; 328/72; 328/105; 328/109
[58] Field of Search .......... 307/443, 480, 269, 262; 328/62

[56] References Cited

U.S. PATENT DOCUMENTS

| | | | |
|---|---|---|---|
| 3,921,079 | 11/1975 | Heffner et al. | 328/62 |
| 4,337,433 | 6/1982 | Yoshimura | 328/55 |
| 4,423,383 | 12/1983 | Svendsen | 328/63 |
| 4,638,256 | 1/1987 | Hong et al. | 328/105 |
| 4,686,480 | 8/1987 | Katto | 328/62 |
| 4,700,350 | 10/1987 | Douglas | 371/37 |
| 4,719,365 | 1/1988 | Misono | 307/269 |

*Primary Examiner*—D. R. Hudspeth

[57] ABSTRACT

An integrated circuit which includes a plurality of input storage circuits, each of which has a first input terminal, a first output terminal and a first clock terminal, and, in synchronism with a clock signal fed to the first clock terminal, stores input signals sequentially appearing at the first input terminal to sequentially produce the input signals to the first output terminal. The integrated circuit further includes a logic circuit section composed of at least one of a combinational logic circuit and a sequential logic circuit, the logic circuit section being connected to the first output terminals of the first input storage circuits for receiving the input signals. The integrated circuit further includes a plurality of output storage circuits each of which has a second input terminal, a second output terminal and a second clock terminal, and, in synchronism with a clock signal fed to the second clock terminal, stores output signals sequentially supplied from the logic circuit section to the second input terminal to sequentially produce the output signals to the second output terminal, and includes clock distribution means for generating the clock signal fed to the second clock terminal and the clock signal fed to the first clock terminal which is delayed in phase relative to the clock signal fed to the second clock terminal.

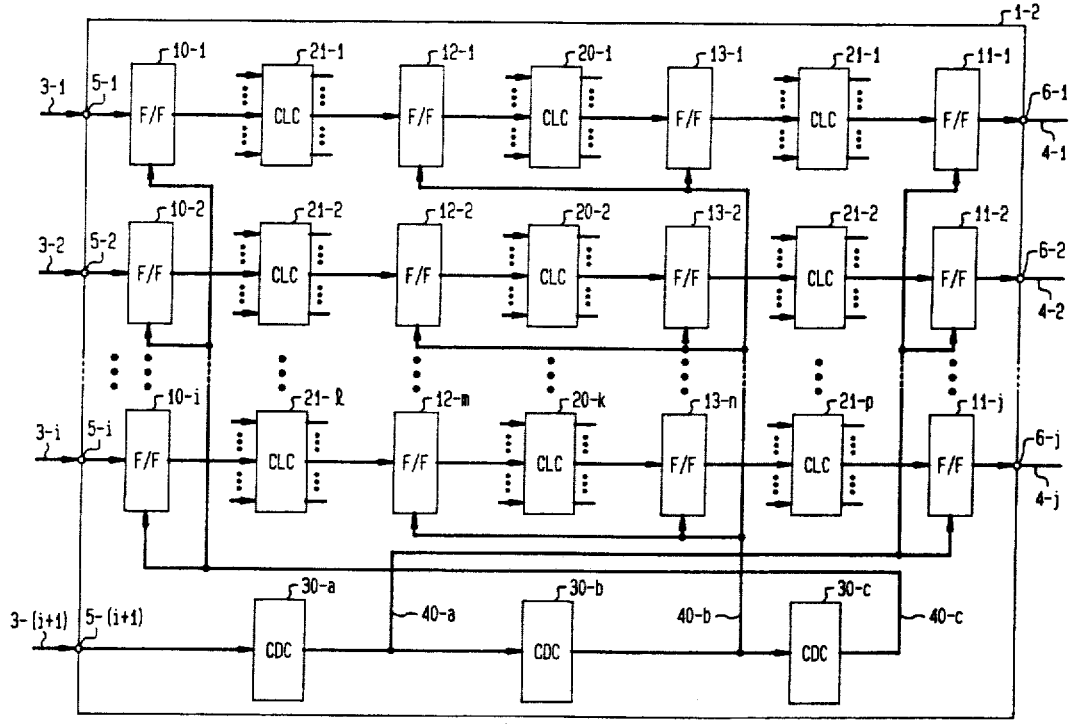

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7, dependent on an amended claim, are determined to be patentable.

1. An integrated circuit comprising:
a plurality of input storage circuits, each of which has a first input terminal, a first output terminal and a first clock terminal, and, in synchronism with a clock signal fed to said first clock terminal, stores input signals sequentially appearing at said first input terminal to sequentially produce said input signals to said first output terminal;
a logic circuit section composed of at least one of a combinational logic circuit and a sequential logic circuit, said logic circuit section being connected to the first output terminals of said input storage circuits for receiving said input signals;
a plurality of output storage circuits, each of which has a second input [terminals] *terminal*, a second output terminal and a second clock terminal, and, in synchronism with a clock signal fed to said second clock terminal, stores output signals sequentially supplied from said logic circuit section to said second input terminal to sequentially produce said output signals to said second output terminal; and
clock distribution means for generating said clock signal fed to said second clock terminal and said clock signal fed to said first clock terminal which is delayed in phase relative to said clock signal fed to said second clock terminal.

* * * * *